Nov. 24, 1964
D. J. LEMENS
3,158,784
SHUNT CAPACITOR BANK
Filed Sept. 6, 1961
2 Sheets-Sheet 1
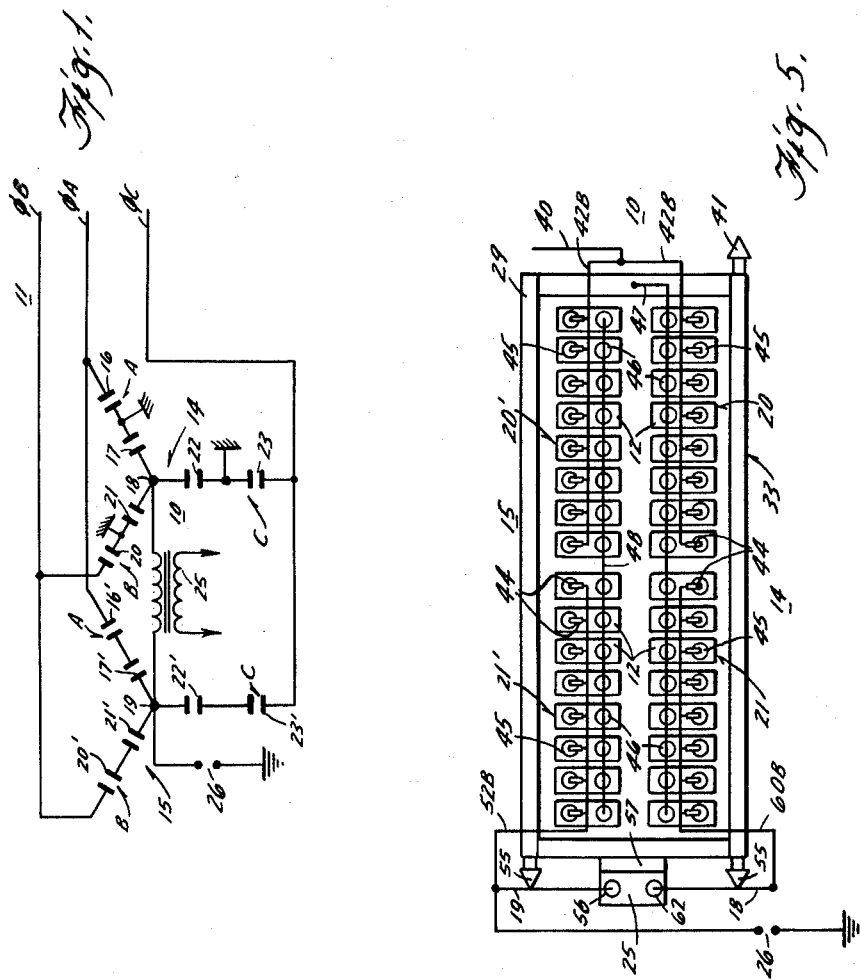
INVENTOR.
Donald J. Lemens
BY Lee H. Kaiser
ATTORNEY.

Nov. 24, 1964  D. J. LEMENS  3,158,784
SHUNT CAPACITOR BANK
Filed Sept. 6, 1961  2 Sheets-Sheet 2
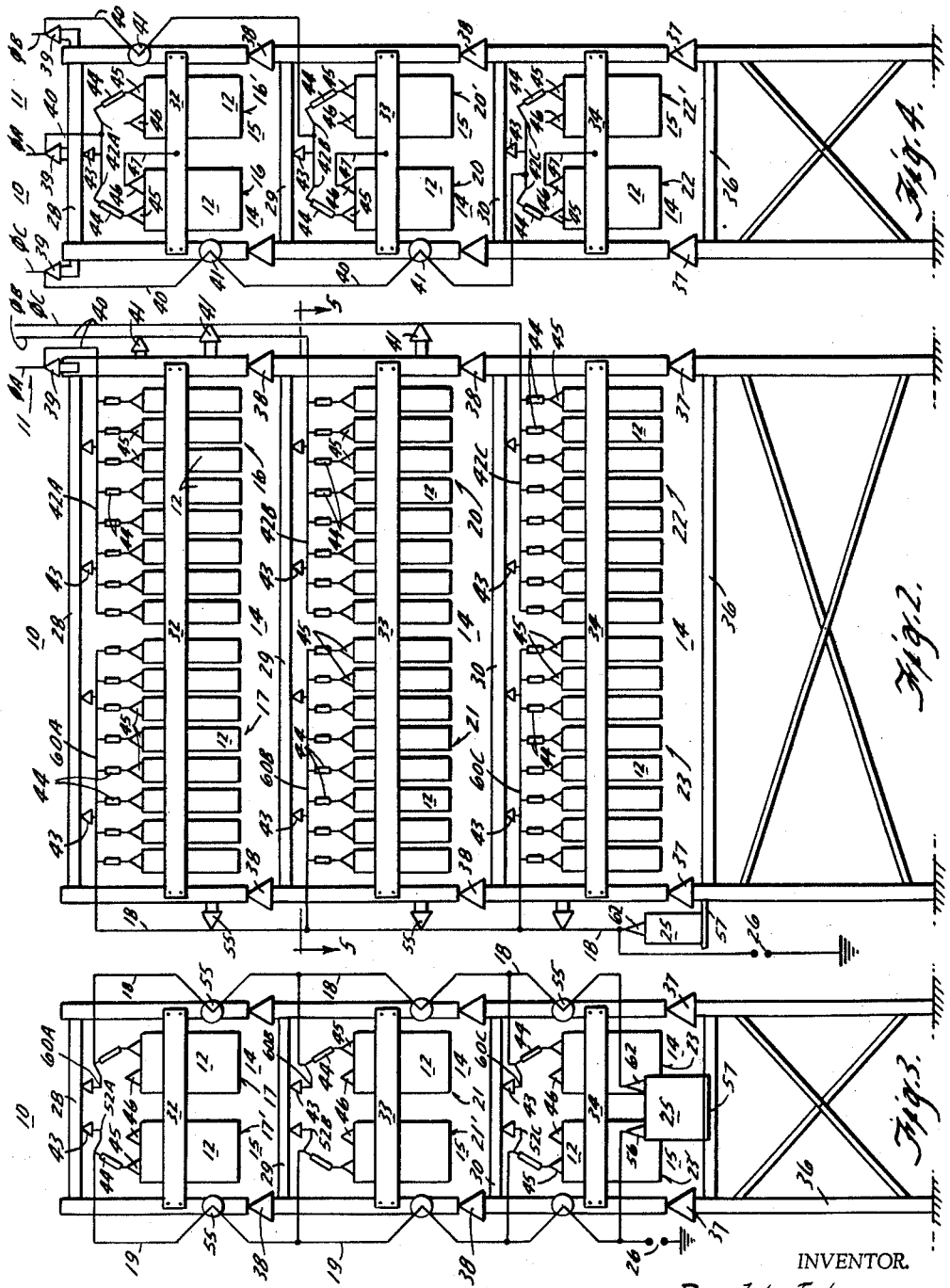
INVENTOR.
Donald J. Lemens
BY
Lee H. Kaiser
ATTORNEY.

United States Patent Office 3,158,784
Patented Nov. 24, 1964

3,158,784
SHUNT CAPACITOR BANK
Donald J. Lemens, South Milwaukee, Wis., assignor to McGraw-Edison Company, Milwaukee, Wis., a corporation of Delaware
Filed Sept. 6, 1961, Ser. No. 136,303
6 Claims. (Cl. 317—12)

This invention relates to shunt capacitors for power factor correction or voltage improvement on electric power transmission and distribution systems and, in particular, to ungrounded neutral, star connected shunt capacitor banks.

It is usually desirable to star connect capacitor units for electric power transmission and distribution circuits of 4160 volts and above, and grounding the neutral of such star connected capacitor units has distinct advantages. The operation of an individual fuse in one phase of a small kilovar bank will not cause a serious voltage unbalance when the neutral is solidly grounded. Further, grounding the neutral of a star connected shunt capacitor bank sometimes permits using capacitor units having a lower insulation level than that corresponding to the circuit voltage. In shunt capacitor banks of small kilovar size individual fuses are usually not used, and if the neutral is not grounded a fault in a capacitor unit may fail to blow the main bank fuses and the resulting unbalance voltages would be excessive.

In some installations it is preferable to star connect the capacitor units and isolate the neutral of the bank, particularly if the number of units per phase in a large kilovar capacitor bank is sufficient to insure satisfactory operation of individual fuses. In power transmission and distribution systems, particularly where three phase, four wire transmission lines are used, harmonic currents will flow in the neutral conductor, and the third and higher harmonic currents may cause serious inductive interference on adjacent communication lines. If the neutral of the star connected bank is ungrounded, the ground return path for harmonic currents is eliminated and inductive interference on adjacent communication lines is substantially reduced. The fault current within a faulty capacitor unit in an ungrounded star connected bank is limited, thus reducing the possibility of rupturing the capacitor unit. Further, fuses with low rupturing capacity can be used in ungrounded star connected banks, and in the event of failure of a single capacitor unit, damage to adjacent units is minimized.

When the neutral of a star connected bank is not grounded, industry standards require that the insulation level of the capacitor units should correspond to the circuit voltage. The casings of the capacitor units are usually mounted on metallic frames which may constitute the floating neutral of an ungrounded star connected bank, and it is accepted industry practice that the insulation level of the neutral should correspond to the circuit voltage. Consequently, base insulators having a voltage rating at least equal to the circuit voltage must be utilized to isolate the metallic framework which supports the capacitor unit casings from ground. Ungrounded neutral star connected shunt capacitor banks may be protected by potential or current transformers connected between the floating neutral and ground, or the bank may be split into two similar star connected halves with potential or current transformers connected between the neutrals of the star connected halves to detect flow of the unbalance current between the neutrals. The industry standards also require that the voltage rating of such potential and current transformers correspond to the circuit voltage.

Lightning voltages and currents in transmission and distribution power line conductors result from the sudden injection of energy into the circuit at the point lightning strikes or over a length of conductor if it is induced by a nearby stroke of lightning, and this energy travels over the transmission or distribution line conductors in the form of traveling waves which may flash over insulators or puncture insulation resulting in a line outage and possibly failure of equipment. Surge-absorbing capacitors are sometimes installed on power lines to modify the shape of the traveling wave and reduce its magnitude together with a lightning arrester which discharges the electric surge to ground and cuts off the flow of power-frequency follow current after the discharge of the transient.

It is an object of the invention to provide an ungrounded star connected shunt capacitor bank wherein the insulation level of the neutral may be considerably less than the circuit voltage.

It is a further object of the invention to provide a floating neutral star connected shunt capacitor bank for electric power transmission and distribution circuits which permits use of insulators between the metallic framework supporting the capacitor unit casings and ground having an insulation level equal to or lower than the phase-to-neutral voltage of the power system. Another object of the invention is to provide such a shunt capacitor bank wherein the insulation level of the unbalance detection current or potential transformers may be lower than that corresponding to the power circuit voltage.

Still another object of the invention is to provide an ungrounded neutral star connected bank for electric power transmission and/or distribution circuits which permits the insulation level between the bank neutral and ground to be lower than that corresponding to the power circuit voltage and which acts as a surge absorber to shape a traveling wave on the power circuit and reduce its magnitude and also discharges the transient energy to ground and prevents the flow of power-frequency follow current.

These and other objects and advantages of the invention will be more readily apparent from the following detailed description when taken in conjunction with the accompanying drawing wherein:

FIG. 1 is a circuit diagram of an ungrounded neutral, star connected shunt capacitor bank embodying the invention;

FIG. 2 is a front view of an open type shunt capacitor bank structure supporting capacitor units connected in accordance with the circuit diagram of FIG. 1;

FIG. 3 is a left end view of the open type shunt capacitor bank structure of FIG. 2;

FIG. 4 is a right end view of the shunt capacitor bank structure of FIG. 2; and

FIG. 5 is a horizontal view taken along lines 5—5 of FIG. 2.

Referring to FIG. 1 of the drawing, the invention will be described as embodied in a three phase, ungrounded neutral shunt capacitor bank 10 connected in star to the conductors $\phi_A$, $\phi_B$, and $\phi_C$ of an alternating current electric transmission line 11. Transmission line 11 may be of 14.4/24.9 kilovolt rating, and capacitor bank 10 may be of 4800 kilovar rating and comprise ninety six two-bushing, 50 kilovar capacitor units 12 of 7200 volt rating split into two identical halves 14 and 15 which are connected in Y to transmission line 11. Each phase A, B, and C of bank 10 has two groups of paralleled capacitor units connected in series in each bank half between the corresponding phase conductor and the neutral of the bank half. Phase A has series groups 16 and 17 in bank half 14 connected between conductor $\phi_A$ and neutral 18 of bank half 14 and also includes groups 16' and 17' in bank half 15 connected between conductor $\phi_A$ and neutral 19 of bank half 15. Phase B of bank 10 includes series groups 20 and 21 in bank half 14 connected between conductor $\phi_B$ and neutral 18 and also has series groups 20' and 21' in bank half 15 connected between conductor $\phi_B$ and neutral 19. Phase C of bank 10 has series groups 22 and 23 in bank half 14 between conductor $\phi_C$ and neutral 18 and also includes series groups 22' and 23' in bank half 15 connected between conductor $\phi_C$ and neutral 19. Each series group comprises eight paralleled fifty kilovar capacitor units 12. Thus each capacitor symbol in FIG. 1 represents eight individually fused, two-bushing capacitor units connected in parallel. Unbalance detecting means for protecting capacitor bank 10 includes a current transformer 25 connected between the neutral 18 of the star bank half 14 and the neutral 19 of the star bank half 15. The neutrals 18 and 19 are normally isolated from ground, and one neutral 19 is connected to ground through an isolating gap 26 which may be a simple rod gap.

Referring to FIGS. 2–5, the capacitor units 12 of bank 10 are shown supported in an open type capacitor bank which is preferably of welded aluminum construction. The capacitor units 12 associated with the phases A, B, and C are respectively mounted in standard metallic frameworks 28, 29, and 30 positioned one above the other in tiers. The metallic framework for each tier and the capacitor units 12 supported thereon are commonly referred to as a "block." Each block of bank 10 is rated at 1600 kilovar and includes the thirty two capacitor units of 50 kilovar rating associated with one phase of the transmission line. The thirty two capacitor units 12 of phase A, comprising series groups 16, 16', 17, and 17', are mounted in two parallel rows upon the metallic framework 28 of the top block 32; the thirty two capacitor units 12 of phase B, comprising series groups 20, 20', 21, and 21', are similarly mounted in two rows upon the framework 29 of the middle block 33; and the thirty two capacitor units of phase C, comprising series groups 22, 22', 23 and 23', are mounted in two rows upon the framework 30 in the bottom block 34. The superimposed blocks 32, 33, and 34 are elevated above ground by metallic structure 36, and schematically illustrated base insulators 37 are interposed between the framework 30 of the bottom block 34 and the metallic elevating structure 36. The metallic framework of the blocks often constitutes the neutral of the banks, particularly with one-bushing capacitor units wherein the capacitor unit tank terminal is connected directly to the metallic framework, and industry standards require the insulation level of the base insulators equal the power circuit voltage. Insulators 38 are interposed between the framework 28 of the uppermost block 32 and the framework 29 of the middle block 33, and similarly insulators 38 are interposed between the framework 29 of the middle block 33 and the framework 30 of the bottom block 34.

The incoming phase conductors $\phi_A$, $\phi_B$, and $\phi_C$ of transmission line 11 are supported upon insulators 39 mounted on the framework 28 of the uppermost block 32 and have vertical portions 40 leading to the blocks 32, 33, and 34 respectively supported on insulators 41 affixed to the vertical metallic leg members of frameworks 28 and 29. The blocks 32, 33, and 34 are identical, and only block 33 supporting the capacitor units of phase B of the bank will be described. The vertical portion of transmission line conductor $\phi_B$ is electrically connected to a metallic bus 42B disposed above the sixteen capacitor units of series groups 20 and 20' in the right end of block 33 as seen in FIGS. 2 and 5. Metallic bus 42B is mounted on insulators 43 depending from the framework 29. Individual fuses 44 connect the bus 42B to the terminals on the outer bushings 45 of the sixteen capacitor units. The terminals on the inner bushings 46 of the front row of capacitor units 12 on block 33 from series groups 20 and 21 are electrically commoned and connected to the framework 29 by a conductor 47 (see FIG. 5) to connect groups 20 and 21 in series. The terminals on the inner bushings 46 of the back row of sixteen capacitor units of block 33 are electrically commoned by a conductor 48 to connect groups 20' and 21' in series.

A metallic bus 52B disposed above the eight capacitor units 12 of series group 21' in the rear row at the left end of block 33 as seen in FIGS. 2 and 5 is mounted on insulators 43 depending from framework 29, and individual fuses 44 connect the terminals on the outer bushings 45 of these eight capacitor units to the bus 52B. Bus 52B is connected to similar buses 52A and 52C of blocks 32 and 34 which are associated with the capacitor units of series groups 17' and 22' by vertical conductor 19 supported on insulators 55 mounted on the metallic frameworks 28, 29 and 30. Conductor 19 constitutes the neutral of capacitor bank half 15 and is connected to the terminal on one bushing 56 of current transformer 25. The casing of current transformer 25 is supported upon a bracket 57 affixed to the metallic elevated structure 36. Conductor 19 is connected through a simple rod gap 26 to ground.

A metallic bus 60B disposed above the eight capacitor units from series group 21 in the front row at the left hand end of block 33 as seen in FIGS. 2 and 5 is similarly mounted on insulators 43 depending from framework 29. Bus 60B is connected by individual fuses 44 to the terminals on the outer bushings 45 of the eight capacitor units 12 of series group 21. Bus 60B is connected by vertical electrical conductor 18 supported upon insulators 55 mounted on the metallic frameworks 28, 29 and 30 to similar buses 60A and 60C associated with series groups 17 and 22. Conductor 18 constitutes the neutral 18 of bank half 14 and is connected to the terminal on the other bushing 62 of the current transformer 25.

The setting of the rod gap 26 is such that sixty cycle and impulse sparkover occurs across the gap 26 rather than across the base insulators 37 or current transformer 25. In many ungrounded neutral star connected banks the metallic framework of the blocks which support the capacitor units constitutes the floating neutral of the bank, and it is accepted practice in the industry that the insulation level of the neutral correspond to the voltage of the power circuit to which the bank is connected. Although the metallic frameworks 28, 29, and 30 of bank 10 do not constitute the bank neutral, the insulation level of the base insulators 37 which primarily isolate the metallic frameworks 28, 29 and 30 carrying the neutral conductors 18 and 19 from ground should at least equal the phase-to-phase voltage of the transmission circuit 11 to conform to industry practice, and in a conventional capacitor bank the base insulators 37 would be of minimum 25 kilovolt rating. In accordance with the invention the base insulators 37 and the current transformer 25 may be of the 15 kilovolt class.

The neutral of a capacitor bank should be at such insulation level that neutral shift during switching of the bank onto and off of the power system will not cause a neutral-to-ground flashover. The neutral of a conventional star capacitor bank connected to the 24.9 kilovolt transmission line 11 may shift to the line-to-neutral potential, i.e., 14.4 kilovolts relative to ground, during switching, but it will be apparent that the 15 kilovolt base insulators 37 will prevent neutral-to-ground flashover inasmuch as an insulator rated at 15 kilovolts can withstand 50 kilovolts at 60 cycle frequency. Further, it will be apparent that any traveling wave on transmission line 11 resulting from a lightning stroke or a switching disturbance will cause the neutral of the bank to spark over to ground at the gap 26 rather than across the base insulators 37 or the current transformer 25. Inasmuch as the sixty cycle and impulse sparkover potential of the gap 26 is less than the insulation level of the base insulators 37 or the current transformer 25, any lightning surge on transmission line 11 will flash over the gap 26 and effectively ground the neutral of the capacitor bank 10. The capacitor bank 10 thus bypasses the lightning current to ground through the gap 26 and will cut off the flow of any power-frequency follow current at the first current zero after the discharge of the lightning current and, in addition, will be effective to modify the shape of the traveling wave and reduce its magnitude. If the capacitive reactances of all three phases A, B and C are equal and no power system unbalance exists, there will be no power current in a multi-series capacitor bank.

While only a single embodiment of the invention has been illustrated and described, many modifications and variations thereof will be apparent to those skilled in the art, and consequently it is intended in the appended claims to cover all such modifications and variations as fall within the true spirit and scope of the invention.

What I claim as new and desire to secure by Letters Patent of the United States is:

1. In combination, a three phase alternating current power line, a three phase capacitor bank comprising a plurality of capacitor units connected in star to said line, individual fuses for said capacitor units, the casings of said capacitor units being mounted on a metallic frame, said metallic frame supporting the neutral of said star connected capacitor units, unbalance detecting means including a transformer connected to said neutral for protecting said capacitor bank, base insulators between said metallic frame and ground, and a gap connected between said metallic frame and ground, the sixty cycle and impulse sparkover potential of said gap being less than that of said base insulators, whereby the insulation level of said base insulators can be lower than the phase-to-phase voltage of said power line, said star bank so gapped to ground being adapted to bypass surges on the conductors of said power line to ground and to interrupt the flow of power-frequency current to ground without disconnecting said capacitor bank from said power line.

2. In combination, a three phase alternating current power line, a three phase shunt capacitor bank comprising a plurality of power factor correction capacitor units connected in star to said power line, individual fuses for said capacitor units, said capacitor units being mounted on metallic frameworks arranged in tiers one above the other, at least one of said frameworks supporting the neutral of said star connected units, unbalance detecting means including a transformer connected to said neutral for protecting said capacitor bank, base insulators between the lowermost of said frameworks and ground, an isolating gap between said neutral and ground having sixty cycle and impulse sparkover potential lower than that of said base insulators, whereby the insulation level of said base insulators can be lower than the phase-to-phase voltage of said power line, said bank so gapped to ground being adapted to bypass traveling waves and surges on said power line to ground through said gap and to interrput the flow of power-frequency current to ground without disconnecting said capacitor bank from said power line.

3. A three phase capacitor bank divided into two groups of encased capacitor units connected in Y to a three phase alternating current power line, individual fuses for said capacitor units, metallic frames supporting the casings of said capacitor units and the neutrals of said Y-connected capacitor units, base insulators between said metallic frames and ground, unbalance detecting means including a transformer connected between said neutrals of said Y-connected groups for protecting said capacitor bank, and an isolating gap connecting one of said neutrals to ground and having sixty cycle and impulse sparkover potential lower than that of said transformer and of said base insulators, whereby the insulation level of said insulators and said transformer may be lower than the phase-to-phase voltage of said alternating current power line, said capacitor bank so gapped to ground being adapted to bypass surges on said power line to ground through said gap and to interrupt power-frequency follow current without disconnecting said capacitor bank from said power line.

4. In combination, a three phase alternating current power line, a three phase shunt capacitor bank connected in Y to said power line and having a plurality of series groups of paralleled capacitor units connected between each of the conductors of said power line and the neutral of said bank, individual fuses for said capacitor units, unbalance detecting means including a transformer connected to said neutral, the casings of said capacitor units being metallic, metallic frames supporting the casings of said capacitor units and the neutral of said bank, insulators between said metallic frames and ground, the insulation level of said transformer and of said insulators being lower than the phase-to-phase voltage of said power line, and an isolating gap between said neutral and ground having sixty cycle and impulse sparkover potential lower than that of said transformer and of said insulators, said capacitor bank so gapped to ground being adapted to bypass surges on said power line to ground through said gap and to interrupt power-frequency current without disconnecting said capacitor bank from said power line.

5. A three phase capacitor bank comprising a plurality of encased capacitor units connected in Y to a three phase alternating current power line, individual fuses for said capacitor units, insulators between the neutral of said Y-connected capacitor units and ground, unbalance detecting means including a transformer connected to said neutral for protecting said capacitor bank, and a gap between said neutral and ground, the sixty cycle and impulse sparkover potential of said gap being less than that of said insulators, said capacitor bank having said gap to ground normally delivering reactive volt-amperes to said power line and being adapted to absorb surge energy of traveling waves from said power line and discharge them to ground through said gap and to interrupt power-frequency follow current without removing said capacitor bank from said power line, whereby the insulation level of said insulators may be lower than the phase-to-phase voltage of said power line.

6. In combination, a three phase alternating current power line, a three phase shunt capacitor bank comprising a plurality of encased power factor correction capacitor units connected in star to said power line, individual fuses for said capacitor units, the casings of said capacitor units being mounted on a metallic framework, one terminal of certain of said capacitor units being connected to said framework and constituting said framework the neutral of said star connected capacitor units, unbalance detecting means including a transformer connected to said neutral for protecting said capacitor bank, base insulators between said framework and ground, and an isolating gap between said neutral and ground having sixty cycle and impulse sparkover potential lower than that of said base insulators, whereby the insulation level of said base insulators can be lower than the phase-to-phase voltage of said power line, said bank so gapped to ground being adapted to bypass surges on said power line to ground through said gap and to interrupt the flow of power-frequency current to ground without disconnecting said capacitor bank from said power line.

References Cited in the file of this patent
UNITED STATES PATENTS

| | | |
|---|---|---|
| 2,799,807 | Schultz | July 16, 1957 |
| 2,942,153 | Schultz | June 21, 1960 |
| 3,080,506 | Minder | Mar. 5, 1963 |